(12) United States Patent
Guo et al.

(10) Patent No.: US 12,718,192 B2
(45) Date of Patent: Aug. 25, 2026

(54) INTELLIGENT REPLENISHMENT MONITORING SYSTEM AND METHOD

(71) Applicant: ASUSTeK COMPUTER INC., Taipei (TW)

(72) Inventors: Shin-Ning Guo, Taipei (TW); Hong-Ru Shen, Taipei (TW); Fu-Xiong Xu, Taipei (TW); Shu-Chiao Liao, Taipei (TW)

(73) Assignee: ASUSTEK COMPUTER INC., Taipei City (TW)

( * ) Notice: Subject to any disclaimer, the term of this patent is extended or adjusted under 35 U.S.C. 154(b) by 465 days.

(21) Appl. No.: 18/173,228

(22) Filed: Feb. 23, 2023

(65) Prior Publication Data

US 2023/0385759 A1 Nov. 30, 2023

(30) Foreign Application Priority Data

May 30, 2022 (TW) ................................. 111120127

(51) Int. Cl.
*G06Q 10/087* (2023.01)

(52) U.S. Cl.
CPC ................................. *G06Q 10/087* (2013.01)

(58) Field of Classification Search
None
See application file for complete search history.

(56) References Cited

U.S. PATENT DOCUMENTS

2008/0204672 A1* 8/2008 Ikeda ..................... A47F 3/001 353/74
2014/0299389 A1* 10/2014 Coleman ............. G01G 3/1404 198/804
2019/0149725 A1* 5/2019 Adato ...................... H04N 1/00 348/158
2019/0215424 A1* 7/2019 Adato .................. G07G 1/0036
2020/0160670 A1* 5/2020 Zalewski ............. G06Q 20/327

FOREIGN PATENT DOCUMENTS

| | | | | |
|---|---|---|---|---|
| CN | 110322197 A | | 10/2019 | |
| CN | 110751497 A | | 2/2020 | |
| CN | 111061890 A | | 4/2020 | |
| CN | 111274845 A | | 6/2020 | |
| CN | 112530086 A | | 3/2021 | |
| JP | 2019513274 A | * | 5/2019 | ........... G06V 10/751 |

* cited by examiner

*Primary Examiner* — Fateh M Obaid
(74) *Attorney, Agent, or Firm* — McClure, Qualey & Rodack, LLP

(57) ABSTRACT

Disclosed are an intelligent replenishment monitoring system and method. The intelligent replenishment monitoring system includes at least one image capture device and a computing device. The image capture device captures at least one shelf to generate a shelf image. The computing device is in signal connection to the image capture device to receive the shelf image. The computing device performs first-stage identification on the shelf image according to a commodity region positioning model, to identify a commodity region image from the shelf image. The computing device performs second-stage identification on the commodity region image according to the at least one commodity replenishment model, to obtain commodity information corresponding to the commodity region image, and generates replenishment information according to the commodity information, so that a staff member replenishes the commodities according to the replenishment information.

30 Claims, 10 Drawing Sheets

INTELLIGENT REPLENISHMENT MONITORING SYSTEM AND METHOD

CROSS-REFERENCE TO RELATED APPLICATION

This application claims the priority benefit of Taiwan application serial No. 111120127, filed on May 30, 2022. The entirety of the above-mentioned patent application is hereby incorporated by reference herein and made a part of the specification.

BACKGROUND OF THE INVENTION

Field of the Invention

The disclosure relates to an intelligent replenishment monitoring system and method for automatically monitoring commodity quantities in real time.

Description of the Related Art

Generally, commodities on shelves in a supermarket are usually replenished within a fixed period of time specified by the supermarket. However, because a staff member does not know which commodities require replenishment, the staff member needs to go back and forth several times to complete the replenishment. It is difficult to properly use manpower for this type of routine replenishment, and the replenishment efficiency is low. The replenishment depends on checking of the staff member or feedback from customers. However, because the staff member usually has multiple job duties, it is difficult to check the shelves in the supermarket at any time. If the customers always find the shelves in the supermarket empty, their willingness to go to the supermarket again is also affected.

BRIEF SUMMARY OF THE INVENTION

According to the first aspect of this disclosure, an intelligent replenishment monitoring system is provided. The intelligent replenishment monitoring system includes at least one image capture device and a computing device. The image capture device captures at least one shelf to generate a shelf image. The computing device is in signal connection to the image capture device to receive the shelf image, where the computing device performs first-stage identification on the shelf image according to a commodity region positioning model, to identify a commodity region image from the shelf image, and the computing device performs second-stage identification on the commodity region image according to at least one commodity replenishment model, to obtain commodity information corresponding to the commodity region image and generate replenishment information according to the commodity information.

According to the second aspect of this disclosure, an intelligent replenishment monitoring method is provided. The intelligent replenishment monitoring method includes: using an image capture device to capture at least one shelf to generate a shelf image; performing first-stage identification on the shelf image according to a commodity region positioning model to identify a commodity region image from the shelf image; performing second-stage identification on the commodity region image according to at least one commodity replenishment model to obtain commodity information corresponding to the commodity region image; and generating replenishment information according to the commodity information.

Based on the above, in the intelligent replenishment monitoring system and method of the disclosure, the image capture device is used to replace manpower and automatically monitor commodities on shelves in real time, to monitor commodity quantities at any time and obtain categories and quantities of commodities requiring replenishment in real time. Therefore, the replenishment efficiency is increased and the burden of a staff member is reduced, thereby avoiding various problems of a well-known replenishment method. Moreover, in the disclosure, analysis is performed according to statistical data to avoid the rush of crowds in a supermarket and estimate an appropriate period of time for replenishment, thereby facilitating allocation of the commodities and the manpower.

DETAILED DESCRIPTION OF THE EMBODIMENTS

Figure 1:
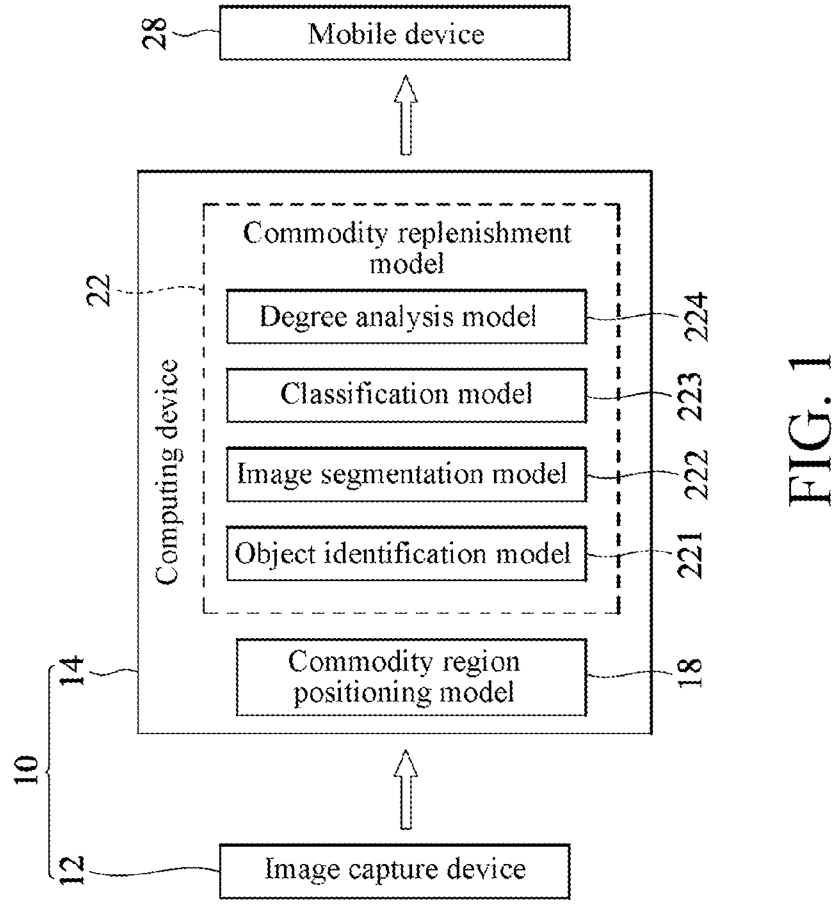
FIG. 1 is a schematic block diagram of an intelligent replenishment monitoring system according to an embodiment of the disclosure.

Exemplary embodiments are provided below for detailed descriptions. However, the embodiments are merely used as examples for illustration, and do not limit the protection scope of the disclosure. In addition, some components are omitted in the drawings of the embodiments, to clearly show technical features of the disclosure. The same reference numbers are used in the drawings to represent the same or similar components.

In the disclosure, commodities on a shelf, especially commodities such as fruits and vegetables, fresh food, and cooked food, including commodities whose quantities are not easy to calculate or commodities that exist in a single unit, are monitored in real time to monitor a size of a commodity region, a commodity quantity, a commodity area, a commodity classification level, a commodity vacancy degree, and the like, and predict whether commodities in a monitoring region require replenishment.

Figure 2:
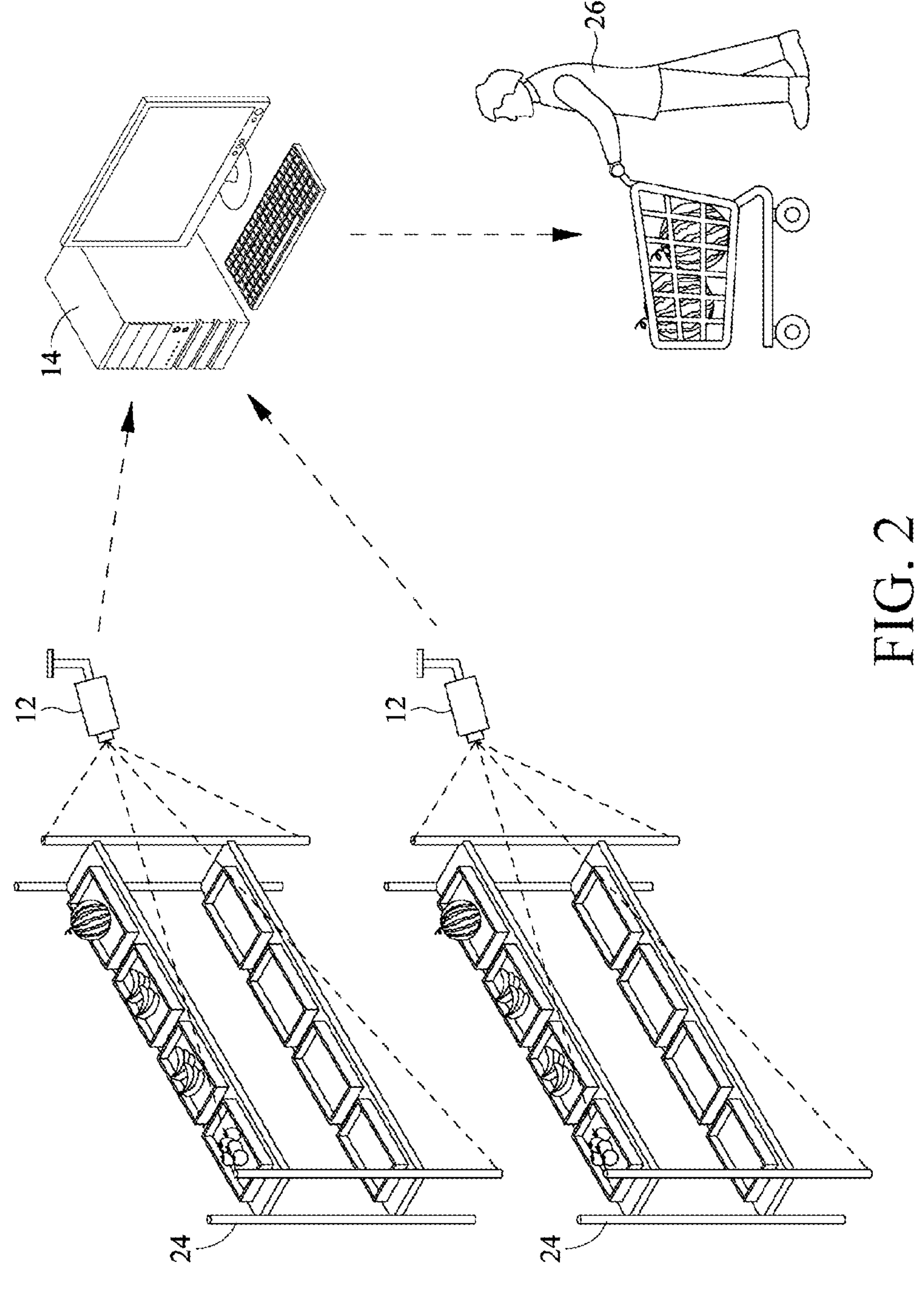
FIG. 2 is a schematic diagram of an application scenario of an intelligent replenishment monitoring system according to an embodiment of the disclosure.
Figure 3:
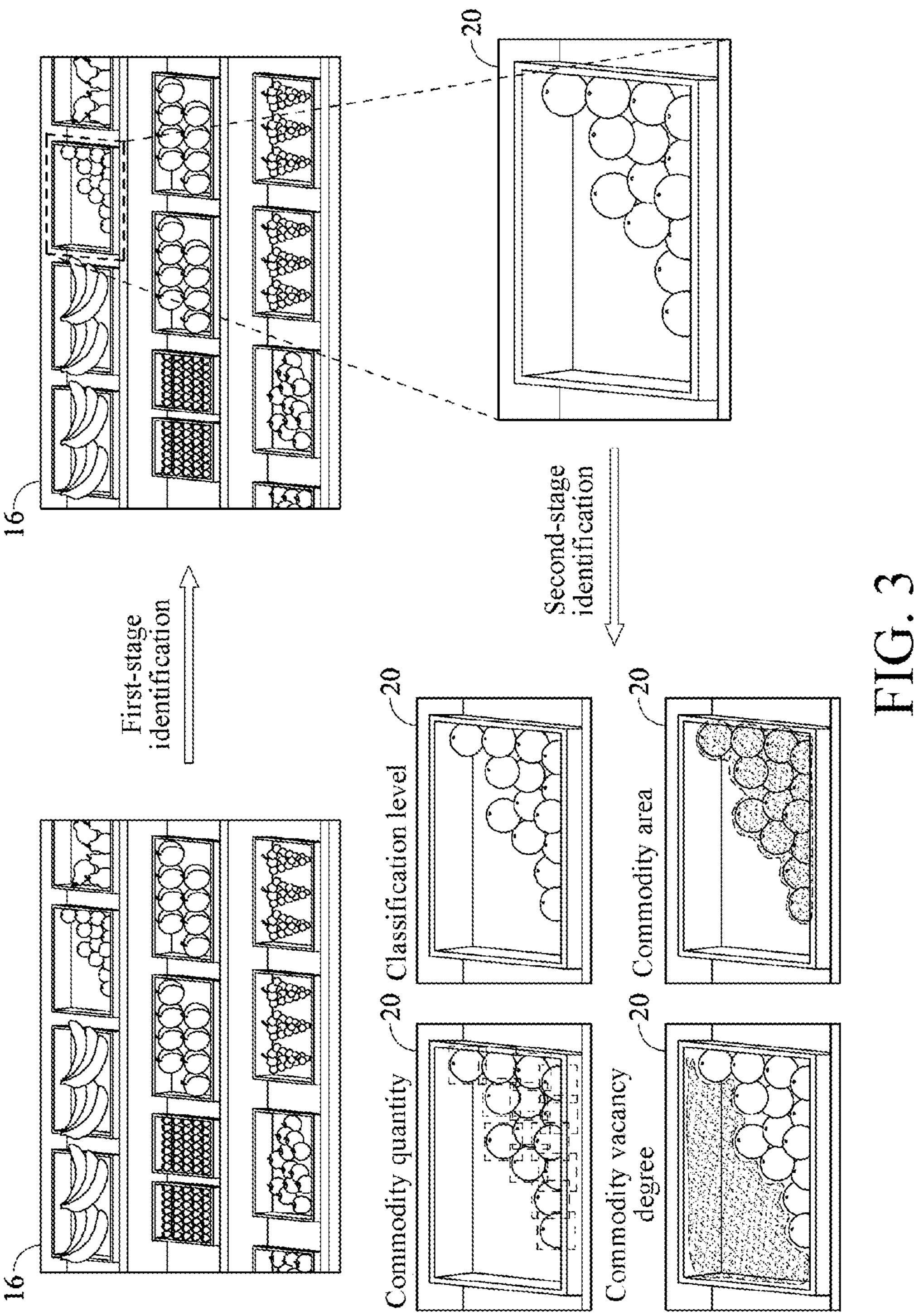
FIG. 3 is schematic image diagrams of performing first-stage identification and second-stage identification according to an embodiment of the disclosure.

Referring to FIG. 1, FIG. 2, and FIG. 3 together, an intelligent replenishment monitoring system 10 includes at least one image capture device 12 and a computing device 14. The image capture device 12 captures at least one shelf 24 to generate a shelf image 16. The computing device 14 is in signal connection to the image capture device 12 in a wired or wireless connection manner. An example in which two image capture devices 12 are wirelessly connected to the computing device 14 is used. The shelf image 16 captured by the image capture devices 12 is wirelessly transmitted to the computing device 14. After receiving the shelf image 16 from the image capture devices 12, the computing device 14 performs first-stage identification on the shelf image 16 according to a commodity region positioning model 18, to identify a commodity region image 20 from the shelf image 16. After obtaining the commodity region image 20, the computing device 14 performs second-stage identification on the commodity region image 20 according to at least one commodity replenishment model 22, to obtain commodity information corresponding to the commodity region image 20. The commodity replenishment model 22 used in the second-stage identification is at least one or any combination of an object identification model 221, an image segmentation model 222, a classification model 223, or a degree analysis model 224. After obtaining the commodity information, the computing device 14 generates replenishment information according to the commodity information. The replenishment information includes a to-be-replenished commodity category and a to-be-replenished quantity. The computing device 14 provides the replenishment information for a staff member 26. That is, the computing device 14 further transmits the replenishment information to a mobile device 28 of the staff member 26, so that the staff member 26 easily obtains the replenishment information to replenish out-of-stock commodities.

In the embodiment shown in FIG. 1, the computing device 14 has the object identification model 221, the image segmentation model 222, the classification model 223, and the degree analysis model 224. However, in other embodiments, the computing device 14 of the disclosure also has only one or more commodity replenishment models 22.

Figure 4A:
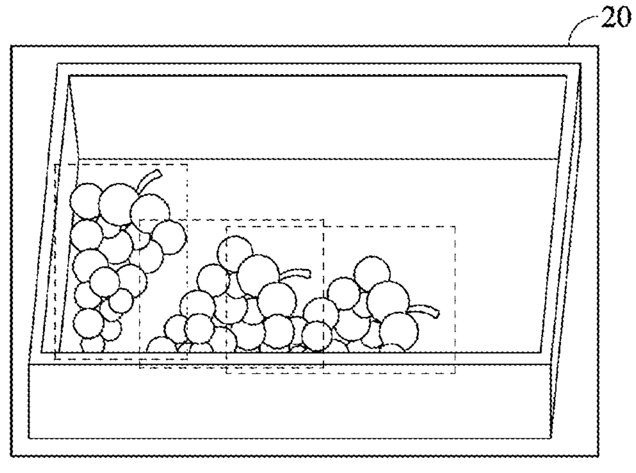
FIG. 4A is a schematic image diagram of an image of detecting a commodity quantity on a commodity region image according to an embodiment of the disclosure.
Figure 4B:
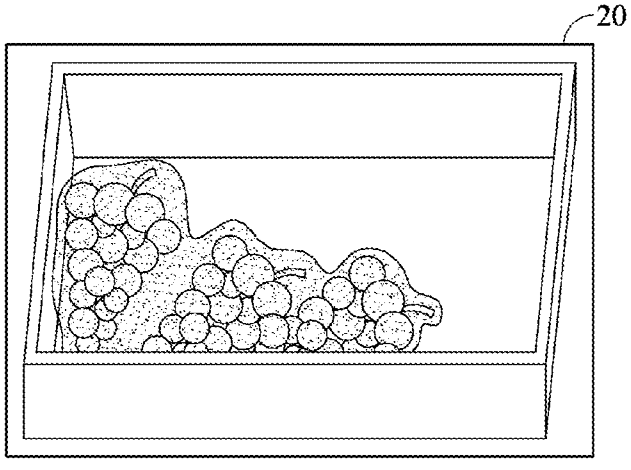
FIG. 4B is a schematic image diagram of an image of detecting a commodity area on a commodity region image according to an embodiment of the disclosure.
Figure 4C:
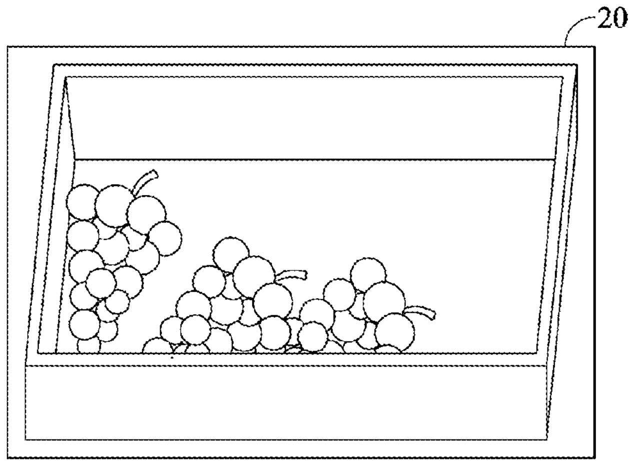
FIG. 4C is a schematic image diagram of detecting a commodity classification level on a commodity region image according to an embodiment of the disclosure.
Figure 4D:
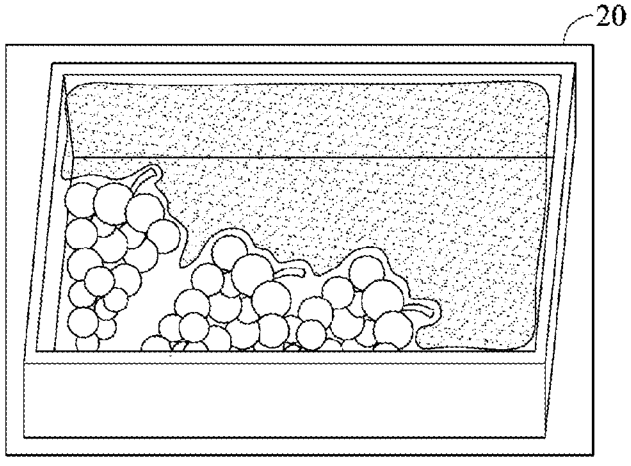
FIG. 4D is a schematic image diagram of detecting a commodity vacancy degree on a commodity region image according to an embodiment of the disclosure.

When the computing device 14 performs the second-stage identification on the commodity region image 20 by using the object identification model 221, as shown in FIG. 4A, the commodity information obtained is a commodity category and a commodity quantity. The computing device 14 determines whether the commodity quantity is less than a quantity threshold as a replenishment basis, and generates the replenishment information in a case that the commodity quantity is less than the quantity threshold. When the computing device 14 performs the second-stage identification on the commodity region image 20 by using the image segmentation model 222, as shown in FIG. 4B, the commodity information obtained is a commodity category and a commodity area. The computing device 14 determines whether the commodity area is less than an area threshold as a replenishment basis, and generates the replenishment information in a case that the commodity area is less than the area threshold. When the computing device 14 performs the second-stage identification on the commodity region image 20 by using the classification model 223, as shown in FIG. 4C, the commodity information obtained is a commodity category and a classification level. The computing device 14 determines whether the classification level is less than a level threshold as a replenishment basis, and generates the replenishment information in a case that the classification level is less than the level threshold. In an embodiment, the vacancy degree is discretized to define different levels. 5 levels are defined as an example, where level 1 is vacant and level 5 is full. The defined levels are considered as classification levels for classification, and together with the commodity category, the classification levels are used for predicting commodities. When the computing device 14 performs the second-stage identification on the commodity region image 20 by using the degree analysis model 224, as shown in FIG. 4D, the commodity information is a commodity category and a commodity vacancy degree. The degree analysis model 224 has two prediction manners. One manner is to input the commodity region image 20 and output the commodity vacancy degree and the commodity category. The other manner is to integrate information such as the commodity quantity, the commodity category, the commodity area, and the classification level into an image or only a number to input, and output the commodity vacancy degree and the commodity category. Then, the computing device 14 determines whether the commodity vacancy degree is greater than a degree threshold as a replenishment basis, and generates the replenishment information in a case that the commodity vacancy degree is greater than the degree threshold.

When the second-stage identification is performed, any combination of the object identification model 221, the image segmentation model 222, the classification model 223, or the degree analysis model 224 is used, and one to four of these models are selected. Model types and model quantities to be used depend on an actual situation in a supermarket to select an optimal commodity replenishment model 22 or a preferable model combination. When two or more commodity replenishment models 22 are selected, the computing device 14 determines replenishment in different manners. Specifically, when a plurality of commodity replenishment models 22 is selected in the disclosure, most results need to be integrated into one discrimination standard. A target interval of the integration is 0 to 1. In this case, weights of the commodity replenishment models 22 are customized, or determined by using simple linear regression. After the weights are determined, results of the commodity replenishment models 22 are multiplied by their respective weights, and then compared with a specified threshold to generate the replenishment information. Therefore, the computing device 14 performs the weighted calculation on a plurality of pieces of commodity information generated by using the plurality of commodity replenishment models 22 to generate a weighted score. The computing device 14 then determines whether the weighted score is less than a threshold as a replenishment basis, and generates the replenishment information in a case that the weighted score is less than the threshold. Alternatively, after a plurality of pieces of commodity information obtained by the computing device 14 performing the second-stage identification on the commodity region image 20 according to the plurality of commodity replenishment models 22 is compared with a threshold respectively, intersection calculation is used as a replenishment basis, and the replenishment information is predicted and generated according to the selected commodity replenishment models 22.

In an embodiment, the image capture device 12 is a camera or another electronic device that captures an image.

In an embodiment, the computing device 14 is a computer host, a notebook computer, a network server, or another electronic device that performs computation independently.

In an embodiment, the commodity region positioning model 18 and the commodity replenishment model 22 in the computing device 14 each are an independent artificial intelligence (AI) model, and each are a trained deep learning model. Therefore, in the disclosure, the commodity region positioning model 18 needs to be established before the commodity region positioning model 18 is used to perform the first-stage identification on the shelf image 16. Similarly, in the disclosure, the commodity replenishment model 22 needs to be established before the commodity replenishment model 22 is used to perform the second-stage identification on the commodity region image 20. That is, the object identification model 221, the image segmentation model 222, the classification model 223, and the degree analysis model 224 need to be established respectively according to different image data.

Figure 5:
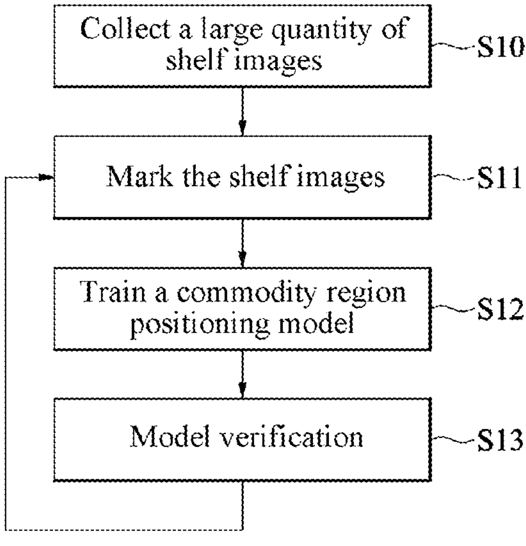
FIG. 5 is a schematic flowchart of training a commodity region positioning model according to an embodiment of the disclosure.

In an embodiment, in the disclosure, the computing device 14 is used to train the commodity region positioning model 18. A training process of the commodity region positioning model 18 is shown in steps S10 to S13 in FIG. 5. Referring to FIG. 1 and FIG. 5 together, as shown in step S10, a large quantity of shelf images are collected. As shown in step S11, each shelf image is marked, to mark a commodity region or a box body range in the shelf image. As shown in step S12, the commodity region positioning model 18 is selected, and is trained according to data of these marked shelf images. After trained in steps S10 to S12, the commodity region positioning model 18 is mounted in the computing device 14. The computing device 14 uses the commodity region positioning model 18 to detect the commodity region on the shelf, to perform first-stage identification and generate a commodity region image to be used in second-stage identification. After model training is completed, model verification is further performed, as shown in step S13. In a verification stage, whether the image is predicted correctly is determined. For an incorrectly determined image, go back to step S11 and repeat step S11 and step S12 for marking and training again. Moreover, in step S13, in the disclosure, when the commodity region positioning model 18 is actually online for monitoring, predicted results are further observed according to an actual situation, and an incorrectly determined image is selected from the results for marking and training again, to optimize the commodity region positioning model 18.

Figure 6:
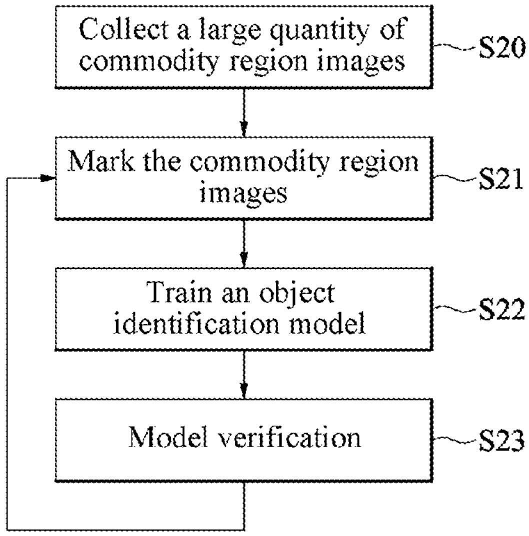
FIG. 6 is a schematic flowchart of training an object identification model according to an embodiment of the disclosure.

In an embodiment, in the disclosure, the computing device 14 is used to train the object identification model 221. A training process of the object identification model 221 is shown in steps S20 to S23 in FIG. 6. Referring to FIG. 1 and FIG. 6 together, as shown in step S20, a large quantity of commodity region images are collected. As shown in step S21, each commodity region image is marked, to mark a commodity region and commodity content in the commodity region image. As shown in step S22, the object identification model 221 is selected, and is trained according to data of these marked commodity region images. After trained in steps S20 to S22, the object identification model 221 is mounted in the computing device 14. The computing device 14 uses the object identification model 221 to detect a commodity region and content thereof on the commodity region image, to perform second-stage identification and generate commodity information including a commodity category and a commodity quantity. After model training is completed, model verification is further performed, as shown in step S23. In a verification stage, whether the commodity region image is predicted correctly by the object identification model 221 is determined. For an incorrectly determined image, go back to step S21 and repeat step S21 and step S22 for marking and training again. Moreover, in step S23, in the disclosure, when the object identification model 221 is actually online for monitoring, predicted results are further observed according to an actual situation, and an incorrectly determined image is selected from the results for marking and training again, to optimize the object identification model 221.

Figure 7:
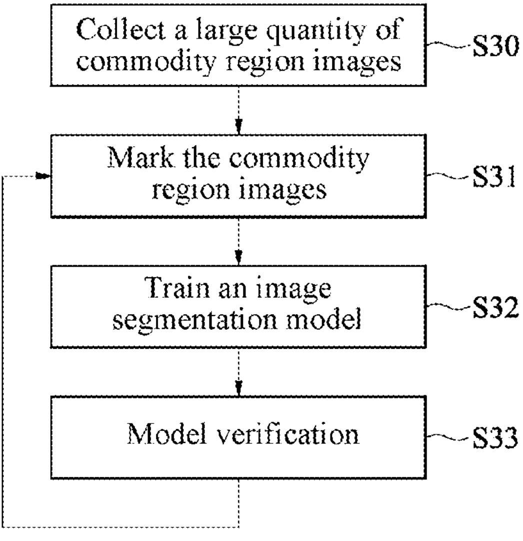
FIG. 7 is a schematic flowchart of training an image segmentation model according to an embodiment of the disclosure.

In an embodiment, in the disclosure, the computing device 14 is used to train the image segmentation model 222. A training process of the image segmentation model 222 is shown in steps S30 to S33 in FIG. 7. Referring to FIG. 1 and FIG. 7 together, as shown in step S30, a large quantity of commodity region images are collected. As shown in step S31, each commodity region image is marked, to mark a commodity area in the commodity region image. As shown in step S32, the image segmentation model 222 is selected, and is trained according to data of these marked commodity region images. After trained in steps S30 to S32, the image segmentation model 222 is mounted in the computing device 14. The computing device 14 uses the image segmentation model 222 to detect ranges of a commodity area and a content area thereof on the commodity region image, to perform second-stage identification and generate commodity information including a commodity category and a commodity area. After model training is completed, model verification is further performed, as shown in step S33. In a verification stage, whether the commodity region image is predicted correctly by the image segmentation model 222 is determined. For an incorrectly determined image, go back to step S31 and repeat step S31 and step S32 for marking and training again. Moreover, in step S33, in the disclosure, when the image segmentation model 222 is actually online for monitoring, predicted results are further observed according to an actual situation, and an incorrectly determined image is selected from the results for marking and training again, to optimize the image segmentation model 222.

Figure 8:
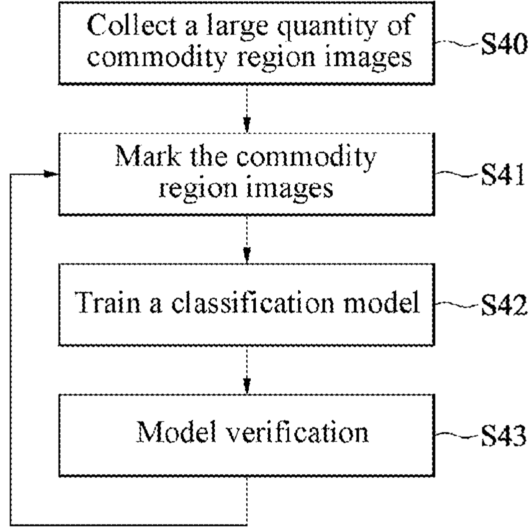
FIG. 8 is a schematic flowchart of training a classification model according to an embodiment of the disclosure.

In an embodiment, in the disclosure, the computing device 14 is used to train the classification model 223. A training process of the classification model 223 is shown in steps S40 to S43 in FIG. 8. Referring to FIG. 1 and FIG. 8 together, as shown in step S40, a large quantity of commodity region images are collected. As shown in step S41, each commodity region image is marked, and vacancy degrees are distinguished according to levels, to mark a level of commodity region vacancy degree on the commodity region image. As shown in step S42, the classification model 223 is selected, and is trained according to data of these marked commodity region images. After trained in steps S40 to S42, the classification model 223 is mounted in the computing device 14. The computing device 14 uses the classification model 223 to detect a level of commodity region vacancy degree on the commodity region image, to perform second-stage identification and generate commodity information including a commodity category and a classification level. After model training is completed, model verification is further performed, as shown in step S43. In a verification stage, whether the commodity region image is predicted correctly by the classification model 223 is determined. For an incorrectly determined image, go back to step S41 and repeat step S41 and step S42 for marking and training again. Moreover, in step S43, in the disclosure, when the classification model 223 is actually online for monitoring, predicted results are further observed according to an actual situation, and an incorrectly determined image is selected from the results for marking and training again, to optimize the classification model 223.

Figure 9:
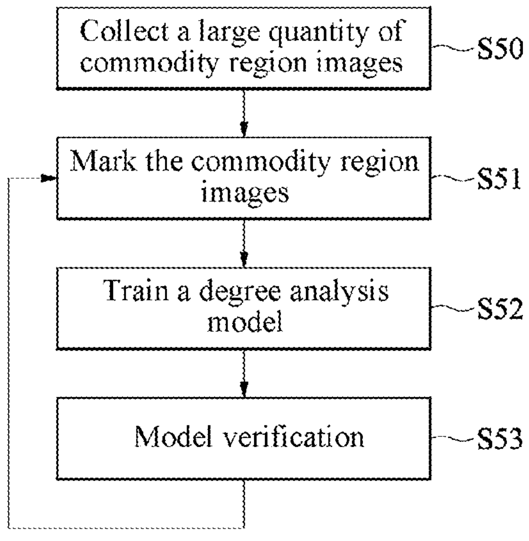
FIG. 9 is a schematic flowchart of training a degree analysis model according to an embodiment of the disclosure.
Figure 10:
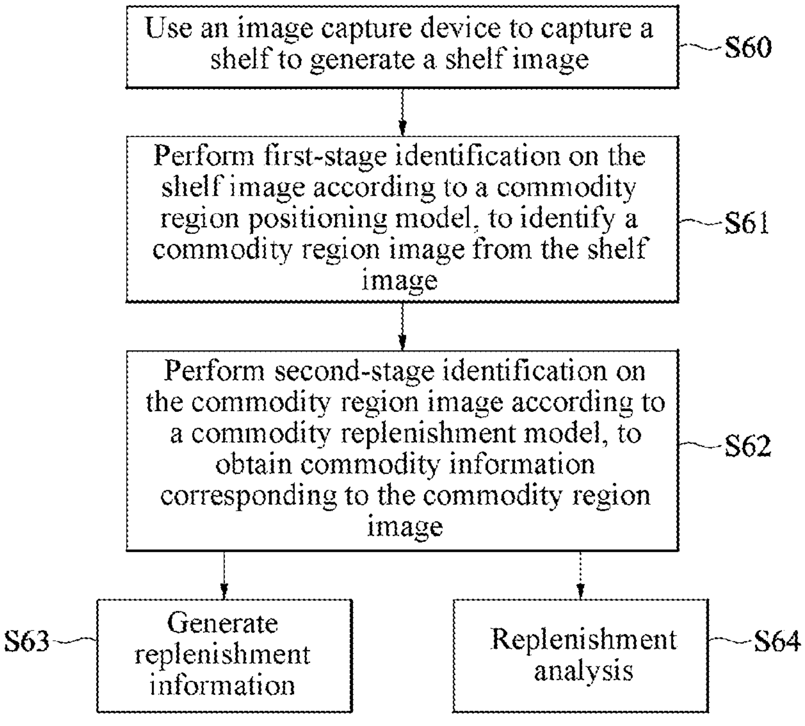
FIG. 10 is a schematic flowchart of an intelligent replenishment monitoring method according to an embodiment of the disclosure.

In an embodiment, in the disclosure, the computing device 14 is used to train the degree analysis model 224. A training process of the degree analysis model 224 is shown in steps S50 to S53 in FIG. 9. Referring to FIG. 1 and FIG. 9 together, as shown in step S50, a large quantity of commodity region images are collected. As shown in step S51, each commodity region image is marked, to mark related information such as a content quantity, a content category, and a commodity area in the commodity region image. As shown in step S52, the degree analysis model 224 is selected, and is trained according to data of these marked commodity region images. After trained in steps S50 to S52, the degree analysis model 224 is mounted in the computing device 14. The computing device 14 uses the degree analysis model 224 to detect a vacancy degree on the commodity region image, to perform second-stage identification and generate commodity information including a commodity category and a commodity vacancy degree. After model training is completed, model verification is further performed, as shown in step S53. In a verification stage, whether the commodity region image is predicted correctly by the degree analysis model 224 is determined. For an incorrectly determined image, go back to step S51 and repeat step S51 and step S52 for marking and training again. Moreover, in step S53, in the disclosure, when the degree analysis model 224 is actually online for monitoring, predicted results are further observed according to an actual situation, and an incorrectly determined image is selected from the results for marking and training again, to optimize the degree analysis model 224.

Referring to FIG. 1 to FIG. 3, and FIG. 10 together, a specific procedure of the intelligent replenishment monitoring system 10 performing an intelligent replenishment monitoring method is shown in steps S60 to S64. In the intelligent replenishment monitoring method, first as shown in step S60, the image capture device 12 is used to capture an image of a shelf 24 to generate a shelf image 16, and the shelf image 16 is transmitted to the computing device 14. As shown in step S61, first-stage identification is performed on the shelf image 16 according to a commodity region positioning model 18 to identify a commodity region image 20 from the shelf image 16. As shown in step S62, second-stage identification is performed on the commodity region image 20 according to a commodity replenishment model 22, to select at least one or any combination of the object identification model 221, the image segmentation model 222, the classification model 223, or the degree analysis model 224. Prediction is performed according to the commodity replenishment model 22, to obtain commodity information corresponding to the commodity region image 20. After the commodity information is obtained, as shown in step S63, replenishment information is generated according to the commodity information. The replenishment information includes a to-be-replenished commodity category and a to-be-replenished quantity method, and is provided for a staff member 26. In an embodiment, the replenishment information is transmitted to a mobile device 28 of the staff member 26, so that the staff member 26 performs replenishment in a supermarket in real time according to the replenishment information. After the commodity information is obtained, as shown in step S64, statistical analysis is further performed according to a generation time of the commodity information and the replenishment information to analyze a period of time for replenishment, to obtain an optimal replenishment time to be provided for the staff member 26 in the supermarket for reference.

In an embodiment, after replenishment, the staff member in the supermarket registers a commodity category and a commodity quantity of the actual replenishment. If the commodity category and the commodity quantity are different from the foregoing predicted results, the commodity replenishment model is trained and adjusted again.

Figure 11:
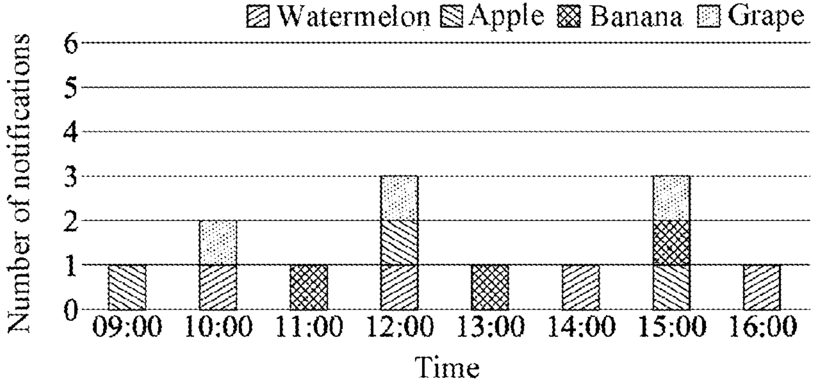
FIG. 11 is a schematic statistical chart of replenishment notifications according to an embodiment of the disclosure.
Figure 12:
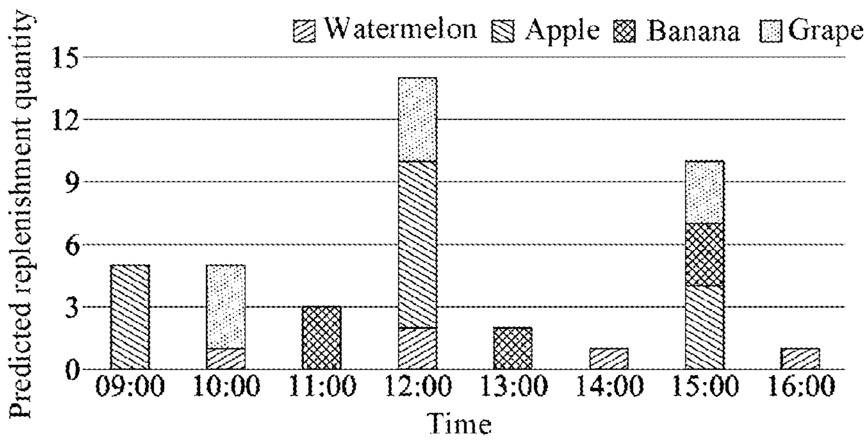
FIG. 12 is a schematic statistical chart of a predicted replenishment quantity according to an embodiment of the disclosure.
Figure 13:
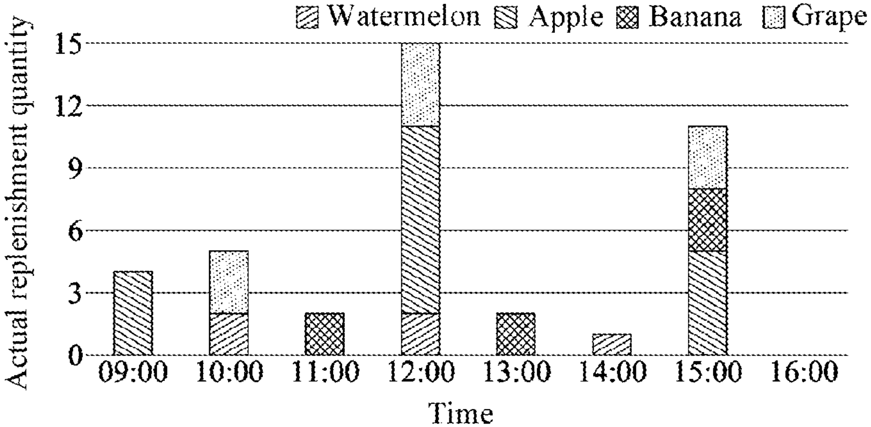
FIG. 13 is a schematic statistical chart of an actual replenishment quantity according to an embodiment of the disclosure.

According to generation times of all commodity information and all replenishment information, in the disclosure, statistical analysis is performed on data by using the computing device 14 to obtain some statistical charts. Analysis is performed by using the statistical charts. FIG. 11 is a schematic statistical chart of replenishment notifications according to an embodiment of the disclosure. FIG. 12 is a schematic statistical chart of a predicted replenishment quantity according to an embodiment of the disclosure. FIG. 13 is a schematic statistical chart of an actual replenishment quantity according to an embodiment of the disclosure. Referring to FIG. 1, FIG. 11, FIG. 12, and FIG. 13 together, according to FIG. 11, an out-of-stock situation is monitored in real time and the quantity of replenishments required is predicted. According to FIG. 12, statistics collection is performed according to a commodity category and a commodity quantity of replenishment predicted by the commodity replenishment model 22, so that the staff member only needs to carry commodities according to the commodity quantity. An optimal everyday fixed period of time for replenishment is obtained through statistics collection according to FIG. 11 and FIG. 12. Feedback of actual replenishment by the staff member is collected, as shown in FIG. 13, which is slightly different from the predicted commodity quantity. Therefore, in the disclosure, the analysis of FIG. 11 and FIG. 13 is used to adjust the replenishment quantity in the commodity replenishment model 22. In the disclosure, the analysis of FIG. 12 and FIG. 13 is used to adjust replenishment notifications in the commodity replenishment model 22.

Based on the above, in the intelligent replenishment monitoring system and method of the disclosure, the image capture device is used to replace manpower and automatically monitor commodities on shelves in real time, to monitor commodity quantities at any time and obtain categories and quantities of commodities requiring replenishment in real time. Therefore, the replenishment efficiency is increased and the burden of a staff member is reduced, thereby avoiding various problems of a well-known replenishment method. Moreover, in the disclosure, analysis is performed according to statistical data to avoid the rush of crowds in a supermarket and estimate an appropriate period of time for replenishment, thereby facilitating allocation of the commodities and the manpower.

The embodiments described above are only used for explaining the technical ideas and characteristics of the disclosure to enable a person skilled in the art to understand and implement the content of the disclosure, and are not intended to limit the patent scope of the disclosure. That is, any equivalent change or modification made according to the spirit disclosed in the disclosure shall still fall within the patent scope of the disclosure.

What is claimed is:

1. An intelligent replenishment monitoring system, comprising:

at least one image capture device, capturing at least one shelf to generate a shelf image; and a computing device, in signal connection to the image capture device to receive the shelf image and has a commodity region positioning model and at least one commodity replenishment model built in, wherein the computing device performs first-stage identification on the shelf image according to the commodity region positioning model, to identify a commodity region image from the shelf image, and the computing device performs second-stage identification on the commodity region image according to the commodity replenishment model, to obtain commodity information corresponding to the commodity region image, and generates replenishment information according to the commodity information; wherein the commodity region positioning model and the commodity replenishment model are each an independent and trained deep learning model.

2. The intelligent replenishment monitoring system according to claim 1, wherein the at least one commodity replenishment model is at least one or a combination of an object identification model, an image segmentation model, a classification model, or a degree analysis model.

3. The intelligent replenishment monitoring system according to claim 2, wherein when the computing device performs the second-stage identification on the commodity region image according to the object identification model, the commodity information is a commodity category and a commodity quantity.

4. The intelligent replenishment monitoring system according to claim 3, wherein the computing device determines whether the commodity quantity is less than a quantity threshold as a replenishment basis, and generates the replenishment information in a case that the commodity quantity is less than the quantity threshold.

5. The intelligent replenishment monitoring system according to claim 2, wherein when the computing device performs the second-stage identification on the commodity region image according to the image segmentation model, the commodity information is a commodity category and a commodity area.

6. The intelligent replenishment monitoring system according to claim 5, wherein the computing device determines whether the commodity area is less than an area threshold as a replenishment basis, and generates the replenishment information in a case that the commodity area is less than the area threshold.

7. The intelligent replenishment monitoring system according to claim 2, wherein when the computing device performs the second-stage identification on the commodity region image according to the classification model, the commodity information is a commodity category and a classification level.

8. The intelligent replenishment monitoring system according to claim 7, wherein the computing device determines whether the classification level is less than a level threshold as a replenishment basis, and generates the replenishment information in a case that the classification level is less than the level threshold.

9. The intelligent replenishment monitoring system according to claim 2, wherein when the computing device performs the second-stage identification on the commodity region image according to the degree analysis model, the commodity information is a commodity category and a commodity vacancy degree.

10. The intelligent replenishment monitoring system according to claim 9, wherein the computing device determines whether the commodity vacancy degree is greater than a degree threshold as a replenishment basis, and generates the replenishment information in a case that the commodity vacancy degree is greater than the degree threshold.

11. The intelligent replenishment monitoring system according to claim 2, wherein the computing device further performs weighted calculation on a plurality of pieces of commodity information generated by using a plurality of commodity replenishment models to generate a weighted score, and the computing device determines whether the weighted score is less than a threshold as a replenishment basis, and generates the replenishment information in a case that the weighted score is less than the threshold.

12. The intelligent replenishment monitoring system according to claim 2, wherein after a plurality of pieces of commodity information obtained by the computing device performing the second-stage identification on the commodity region image according to a plurality of commodity replenishment models is compared with a threshold respectively, intersection calculation is used as a replenishment basis, and the replenishment information is generated according to the selected commodity replenishment models.

13. The intelligent replenishment monitoring system according to claim 1, wherein the replenishment information comprises a to-be-replenished commodity category and a to-be-replenished quantity.

14. The intelligent replenishment monitoring system according to claim 1, wherein the computing device further transmits the replenishment information to a mobile device.

15. The intelligent replenishment monitoring system according to claim 1, wherein the computing device further performs statistical analysis according to a generation time of the commodity information and the replenishment information to obtain an optimal replenishment time.

16. An intelligent replenishment monitoring method, comprising:

using an image capture device to capture at least one shelf to generate a shelf image;

performing first-stage identification on the shelf image according to a commodity region positioning model built in a computing device to identify a commodity region image from the shelf image, wherein the commodity region positioning model is an independent and trained deep learning model;

performing second-stage identification on the commodity region image according to at least one commodity replenishment model built in the computing device to obtain commodity information corresponding to the commodity region image, wherein the commodity replenishment model is another independent and trained deep learning model; and generating replenishment information according to the commodity information.

17. The intelligent replenishment monitoring method according to claim 16, wherein the at least one commodity replenishment model is at least one or a combination of an object identification model, an image segmentation model, a classification model, or a degree analysis model.

18. The intelligent replenishment monitoring method according to claim 17, wherein after the second-stage identification is performed on the commodity region image according to the object identification model, the commodity information obtained is a commodity category and a commodity quantity.

19. The intelligent replenishment monitoring method according to claim 18, wherein in the step of generating the replenishment information according to the commodity information, the method further comprises: determining whether the commodity quantity is less than a quantity threshold as a replenishment basis, and generating the replenishment information in a case that the commodity quantity is less than the quantity threshold.

20. The intelligent replenishment monitoring method according to claim 17, wherein after the second-stage identification is performed on the commodity region image according to the image segmentation model, the commodity information obtained is a commodity category and a commodity area.

21. The intelligent replenishment monitoring method according to claim 20, wherein in the step of generating the replenishment information according to the commodity information, the method further comprises: determining whether the commodity area is less than an area threshold as a replenishment basis, and generating the replenishment information in a case that the commodity area is less than the area threshold.

22. The intelligent replenishment monitoring method according to claim 17, wherein after the second-stage identification is performed on the commodity region image according to the classification model, the commodity information obtained is a commodity category and a classification level.

23. The intelligent replenishment monitoring method according to claim 22, wherein in the step of generating the replenishment information according to the commodity information, the method further comprises: determining whether the classification level is less than a level threshold as a replenishment basis, and generating the replenishment information in a case that the classification level is less than the level threshold.

24. The intelligent replenishment monitoring method according to claim 17, wherein after the second-stage identification is performed on the commodity region image according to the degree analysis model, the commodity information obtained is a commodity category and a commodity vacancy degree.

25. The intelligent replenishment monitoring method according to claim 24, wherein in the step of generating the replenishment information according to the commodity information, the method further comprises: determining whether the commodity vacancy degree is greater than a degree threshold as a replenishment basis, and generating the replenishment information in a case that the commodity vacancy degree is greater than the degree threshold.

26. The intelligent replenishment monitoring method according to claim 17, wherein in the step of generating the replenishment information according to the commodity information, the method further comprises: performing weighted calculation on a plurality of pieces of commodity information generated by using a plurality of commodity replenishment models to generate a weighted score; and determining whether the weighted score is less than a threshold as a replenishment basis, and generating the replenishment information in a case that the weighted score is less than the threshold.

27. The intelligent replenishment monitoring method according to claim 17, wherein in the step of generating the replenishment information according to the commodity information, the method further comprises: after a plurality of pieces of commodity information obtained by performing the second-stage identification on the commodity region image according to a plurality of commodity replenishment models is compared with a threshold respectively, using intersection calculation as a replenishment basis, and generating the replenishment information according to the selected commodity replenishment models.

28. The intelligent replenishment monitoring method according to claim 16, wherein the replenishment information comprises a to-be-replenished commodity category and a to-be-replenished quantity.

29. The intelligent replenishment monitoring method according to claim 16, further comprising: transmitting the replenishment information to a mobile device.

30. The intelligent replenishment monitoring method according to claim 16, further comprising: performing statistical analysis according to a generation time of the commodity information and the replenishment information to obtain an optimal replenishment time.

* * * * *